US012786749B2

(12) United States Patent
Xie et al.

(10) Patent No.: US 12,786,749 B2
(45) Date of Patent: Nov. 3, 2026

(54) ACTIVATION/DEACTIVATION OF CARRIERS AND CARRIER FREQUENCIES

(71) Applicant: ZTE Corporation, Shenzhen (CN)

(72) Inventors: Feng Xie, Shenzhen (CN); Fei Wang, Shenzhen (CN); Hanchao Liu, Shenzhen (CN); Yan Xue, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 317 days.

(21) Appl. No.: 18/612,872

(22) Filed: Mar. 21, 2024

(65) Prior Publication Data

US 2024/0236715 A1 Jul. 11, 2024

Related U.S. Application Data

(63) Continuation of application No. PCT/CN2021/119863, filed on Sep. 23, 2021.

(51) Int. Cl.

*H04W 24/02* (2009.01)
*H04W 72/0453* (2023.01)
*H04W 72/1263* (2023.01)
*H04W 72/232* (2023.01)

(52) U.S. Cl.

CPC ....... *H04W 24/02* (2013.01); *H04W 72/0453* (2013.01); *H04W 72/1263* (2013.01); *H04W 72/232* (2023.01)

(58) Field of Classification Search

CPC ............. H04W 24/02; H04W 72/0453; H04W 72/1263; H04W 72/232

See application file for complete search history.

(56) References Cited

U.S. PATENT DOCUMENTS

| | | | | |
|---|---|---|---|---|
| 2010/0172428 | A1* | 7/2010 | Pani | H04L 1/0027 375/262 |
| 2018/0027471 | A1* | 1/2018 | Zhang | H04W 36/08 455/436 |
| 2019/0090107 | A1* | 3/2019 | Kim | H04W 76/11 |

(Continued)

FOREIGN PATENT DOCUMENTS

| | | | |
|---|---|---|---|
| CA | 3034009 | A1 | 8/2019 |
| CN | 113424634 | A | 9/2021 |

(Continued)

OTHER PUBLICATIONS

EPO, Extended European Search Report for European Application No. 21957795.4, mailed on Dec. 9, 2024, 14 pages.

(Continued)

*Primary Examiner* — Deepa Belur

(74) *Attorney, Agent, or Firm* — Ashurst Perkins Coie US LLP

(57) ABSTRACT

System, apparatus and methods for wireless communication are described. One example method includes receiving, by a wireless device, a higher layer message carrying a radio configuration information that provides multiple mappings between one carrier and multiple carrier frequencies, wherein the higher layer message is received at or above a radio link layer; and operating in response to receiving a lower layer message, the wireless device according to a mapping indicated in the lower layer message.

20 Claims, 20 Drawing Sheets

1500

(56) References Cited

U.S. PATENT DOCUMENTS

| | | | | |
|---|---|---|---|---|
| 2019/0380098 | A1 | 12/2019 | Liu et al. | |
| 2020/0145967 | A1 | 5/2020 | Park et al. | |
| 2020/0403761 | A1 | 12/2020 | Nguyen | |
| 2021/0160834 | A1* | 5/2021 | Peng | H04L 5/0094 |
| 2021/0329635 | A1 | 10/2021 | Ng et al. | |
| 2021/0400606 | A1* | 12/2021 | Zhou | H04W 56/0015 |
| 2022/0217559 | A1* | 7/2022 | Nory | H04W 52/0229 |
| 2023/0319656 | A1* | 10/2023 | Jung | H04W 48/08 |
| 2026/0019983 | A1* | 1/2026 | Xiong | H04L 5/005 |

FOREIGN PATENT DOCUMENTS

| | | | | |
|---|---|---|---|---|
| KR | 10-2225403 | B1 | 3/2021 | |
| WO | 2021147796 | A1 | 7/2021 | |
| WO | 2023044658 | A1 | 3/2023 | |
| WO | WO-2024163051 | A1 * | 8/2024 | H04W 64/00 |

OTHER PUBLICATIONS

International Search Report for International Application No. PCT/CN2021/119863, Mail Date:Apr. 25, 2022. 9 pages.

MOIP, Office Action for Korean Application No. 10-2024-7009559, mailed on Jun. 29, 2026, 10 pages with unofficial English translation.

Samsung, "Multi-beam enhancements," 3GPP TSG RAN WG1 #106-e, e-Meeting, R1-2106865, Aug. 16-27, 2021, 24 pages.

MediaTek Inc., "Enhancement on multi-beam operation," 3GPP TSG RAN WG1 #106-e, e-Meeting, R1-2107485, Aug. 16-27, 2021, 37 pages.

INPI, First Examination Report for Indian Application No. 202417019981, mailed on May 25, 2026, 7 pages.

* cited by examiner

ACTIVATION/DEACTIVATION OF CARRIERS AND CARRIER FREQUENCIES

CROSS REFERENCE TO RELATED APPLICATIONS

This patent document is a continuation of and claims benefit of priority to International Patent Application No. PCT/CN2021/119863, filed on Sep. 23, 2021. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques will provide support for an increased number of users and devices.

SUMMARY

This document relates to methods, systems, and devices for activation or deactivation of radio configuration in mobile communication technology.

In one exemplary aspect, a wireless communication method is disclosed. The method includes receiving, by a wireless device, a higher layer message carrying a radio configuration information that provides multiple mappings between one carrier and multiple carrier frequencies, wherein the higher layer message is received at or above a radio link layer and operating in response to receiving a lower layer message, the wireless device according to a mapping indicated in the lower layer message.

In another exemplary aspect, a wireless communication method is disclosed. The method includes receiving, by a wireless device, a low layer control message that indicates a mapping from multiple mappings between a carrier and multiple carrier frequencies, wherein the low layer is below a radio link layer, wherein the multiple mappings are previously received through a high layer message, wherein the high layer is at or above the radio link layer, wherein the carrier is used for communication between the wireless device and a network device, and using the carrier, responsive to the low layer control message, according to the mapping between the carrier and the carrier frequency.

In yet another example aspect, a method of wireless communication is disclosed. The method includes transmitting, by a network device to one or more wireless devices, a higher layer message carrying a radio configuration information that provides multiple mappings between one carrier and multiple carrier frequencies, wherein the higher layer message is transmitted at or above a radio link layer; and transmitting, after the higher layer message carrying the radio configuration information is transmitted, a lower layer message instructing a wireless device to operate according to a mapping.

In yet another example aspect, a method of wireless communication is disclosed. The method transmitting, by a network device, multiple mappings between a carrier and multiple carrier frequencies, wherein the high layer control message is at or above the radio link layer; and transmitting, after the multiple mappings are transmitted, a low layer control message indicating a mapping from the multiple mappings for operating a wireless device, wherein the low layer is below a radio link layer.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
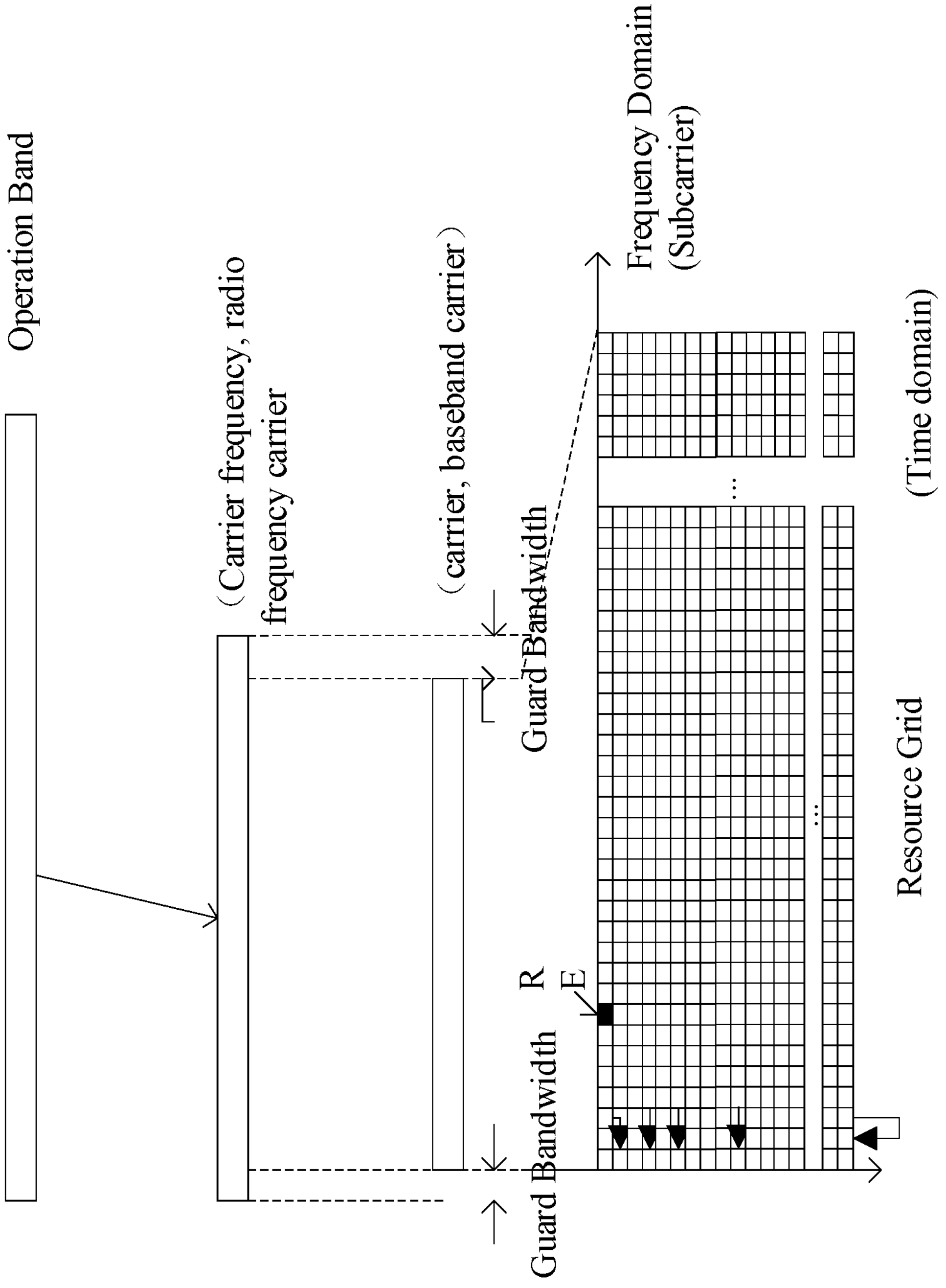
FIG. 1 shows an example relationship between carrier to carrier frequency.

Section headings are used in the present document only to improve readability and do not limit scope of the disclosed embodiments and techniques in each section to only that section.

The wireless spectrum is mainly used for communication coverage of mobile networks and is a non-renewable resource. Different countries have different radio frequency spectrum allocation rules and regulations.

The present application proposes a technology for flexibly mapping from carrier to carrier frequency to solve the problem of limited carrier coverage Wireless spectrum is mainly used for communication coverage on mobile networks. The Third Generation Partnership Project 3GPP standard in the 38.101 protocol introduces the definition of a global frequency raster (Global Frequency Raster, GFR) for the 0 to 100 GHz frequency range, and uniform numbering of frequency points with the global grid as a step (NR New Radio Frequency Channel, NR-ARFCN). The purpose of the numbering is to use signaling instructions for RF channels. The standard coordinates spectrum distribution within different countries, defines the frequencies can be used in different modes, and forms the Operating Bands. Depending on their planning, the operators divide the spectrum assigned to their use into multiple carrier frequencies, including absolute frequency points and channel bandwidths. Different carrier frequencies will form different coverage ranges due to the differences in the electromagnetic wave propagation characteristics. In general, the lower the frequency point, the greater the coverage range, and the higher the frequency point, the smaller the coverage range. According to the existing technology, the communication signal is carried on a carrier and then mapped to a radio frequency by the carrier. The carrier and the radio frequency have a one-to-one correspondence relationship. The performance of a communication system is limited by the coverage range of the radio frequency, e.g., when the radio frequency coverage range is limited, the communication of the system cannot continue.

The global frequency raster may be defined for all frequencies from 0 to 100 GHz. The granularity of the global frequency raster is $\Delta F_{Global}$.

RF reference frequencies are designated by an NR Absolute Radio Frequency Channel Number (NR-ARFCN) in the range (0 . . . 2016666) on the global frequency raster. The relation between the NR-ARFCN and the RF reference frequency $F_{REF}$ in MHz is given by the following equation, where $F_{REF\text{-}Offs}$ and $N_{Ref\text{-}Offs}$ are given in table 5.4.2.1-1 and $N_{REF}$ is the NR-ARFCN.

Based on the technical description, the following example definitions are given:

Carrier Frequency: Corresponds to an absolute frequency domain range (for example, 2450 MHz to 2550 Mhz), or an absolute frequency domain range in a certain frequency band. The absolute frequency domain range can be represented by an absolute frequency point ARFCN and a bandwidth. A carrier frequency can also be called a physical carrier or a radio frequency carrier.

Carrier: A set of subcarriers based on at least one subcarrier interval. Carrier may also be called a baseband carrier.

Carrier frequency set: contains one or more carrier frequencies, which are configured through high-level signaling.

Carrier frequency set: contains one or more carrier frequencies, which can be configured through high-level signaling.

Candidate carrier frequency set: select several carrier frequencies from the carrier frequency set to be a subset of the carrier frequency set.

FIG. 1 is a schematic diagram of an existing protocol from carrier to carrier frequency. Carrier and carrier frequency have a one-to-one correspondence relationship. FIG. 1 is a schematic diagram showing carrier to carrier frequency in the present protocol. FIG. 1 is based on the FIG. 5.3.1-1 of protocol Third Generation Partnership Project (3GPP) 38.101 and further adds the mapping relationship between the transmission bandwidth and the resource grid. FIG. 1 shows an operation band (top) that includes a carrier frequency or a radio frequency carrier, which is characterized by a guard band on either side, with a baseband carrier in the remaining portion. The resource may be represented by the resource grid made up of time and frequency resources (e.g., time slots and subcarriers).

Figure 2:
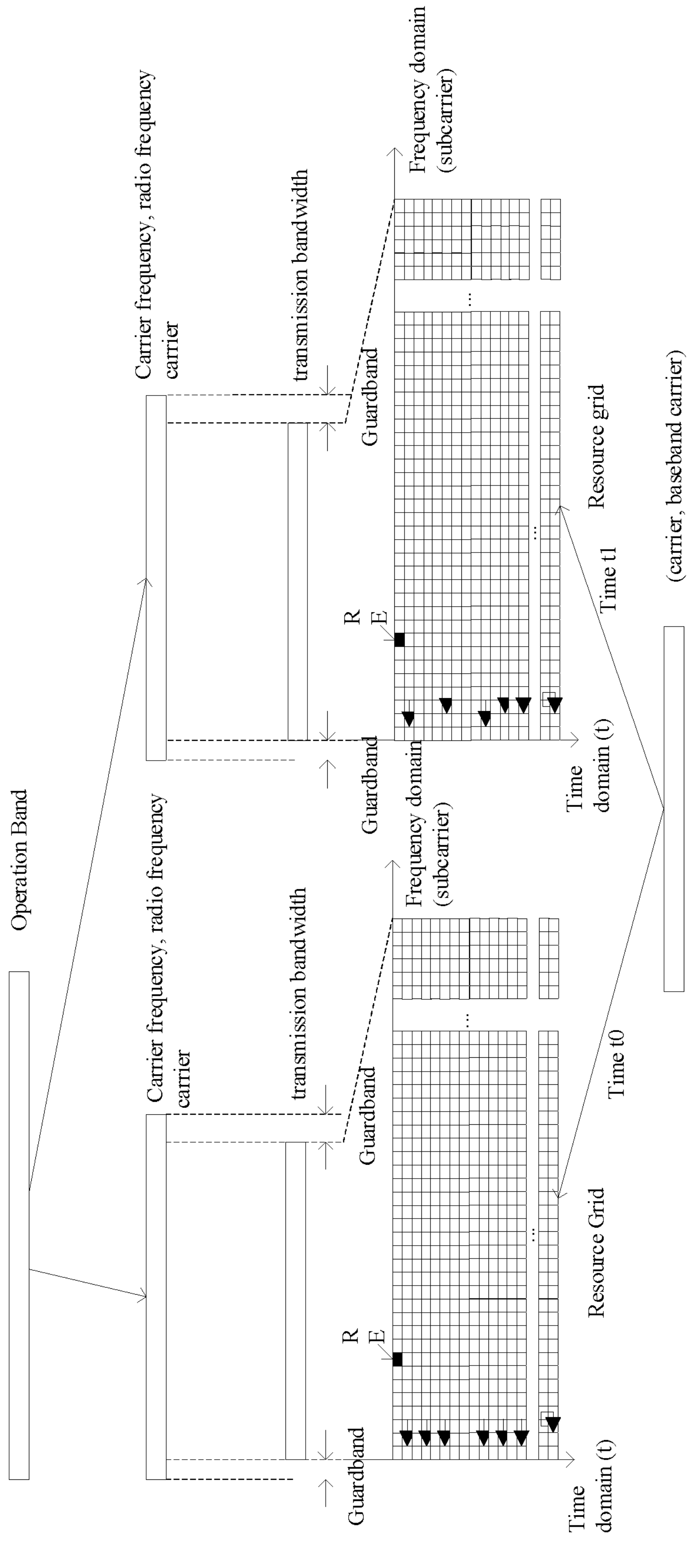
FIG. 2 depicts an example implementation of carrier switch operation.

FIG. 2 is a schematic diagram of a mapping from carrier frequency to a carrier as described in the present application. According to some embodiments, carriers can be mapped to different carrier frequencies at different times. For example, a carrier can be mapped to a carrier frequency 1 is at time t0 and the same carrier can be mapped to a carrier frequency 2 at another time t1. This change in the mapping may be called Carrier Frequency Switch. Compared with FIG. 1, the carrier mapping in FIG. 2 is more flexible.

In order to achieve the flexible switching of carrier frequencies, the network side may configure multiple carrier frequencies for the terminal in advance, which is called a carrier frequency set. Furthermore, it is also possible to select some of the carriers from the configured carrier frequency set as the subsequent candidate carrier frequency set. The carrier can flexibly switch its corresponding carrier frequency within the set range.

Figure 3:
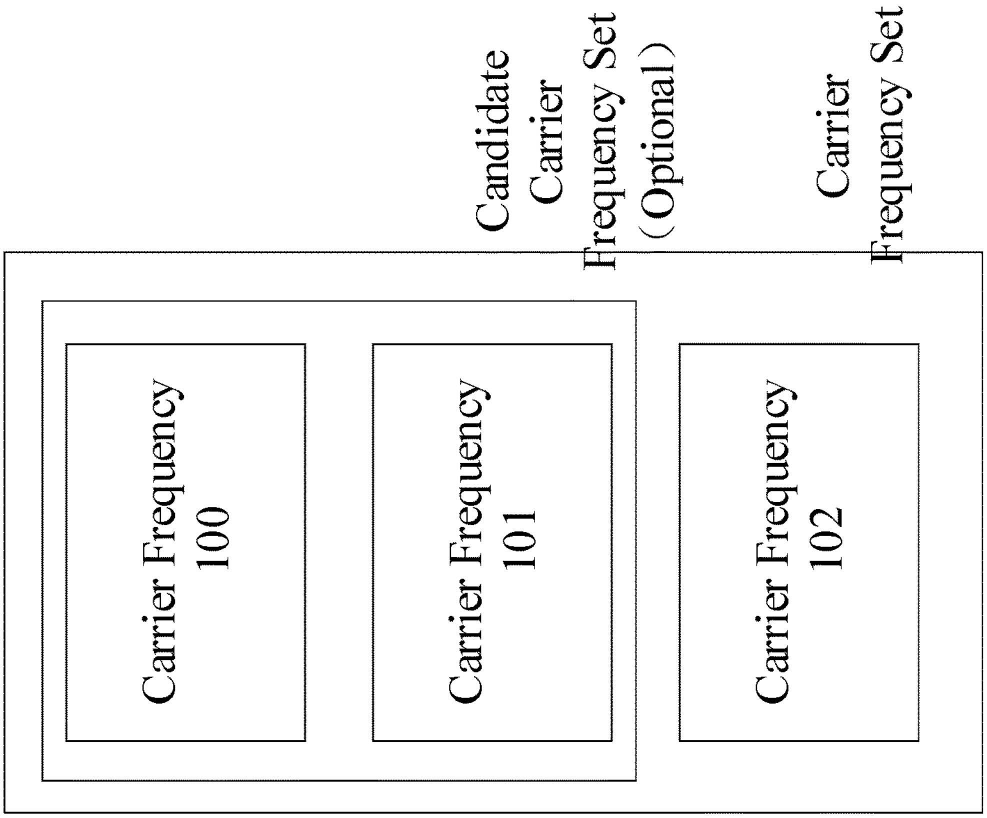
FIG. 3 is a schematic diagram of a carrier frequency set/candidate carrier frequency set.

FIG. 3 is a schematic diagram of a carrier frequency set/candidate carrier frequency set. The candidate carrier frequency set is a subset of the carrier frequency set. As shown in FIG. 3, the set may include a listing of various carrier frequencies 100, 101, 102.

Embodiment 1: (5G Carrier Frequency Switching Process)

This embodiment provides a carrier mapping mode and examples of its usage mode, which extends the carrier mapping range to a carrier frequency set, so that the carrier can be flexibly mapped to a carrier frequency in the carrier frequency set.

Figure 4:
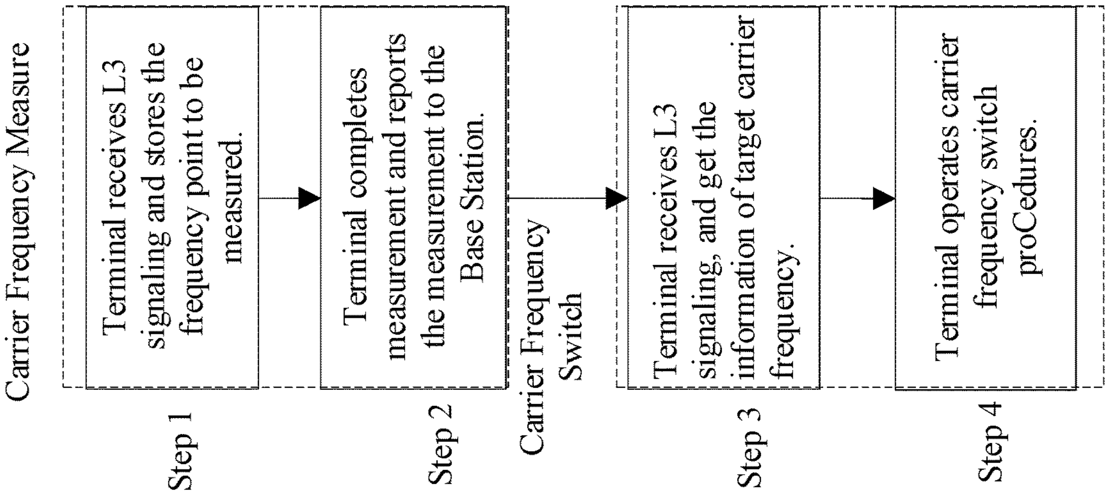
FIG. 4 is a flowchart for an example method of carrier frequency switch operation.

FIG. 4 is a flowchart illustrating a method of carrier frequency switch. The network side sends one or more frequency points, or frequencies, to be measured to the terminal (UE). The terminal performs the measurement according to the received frequency point(s), and reports the measurements to the network side. After receiving the measurement report, the network side informs the terminal the target frequency point through L3 signaling.

Figure 5:
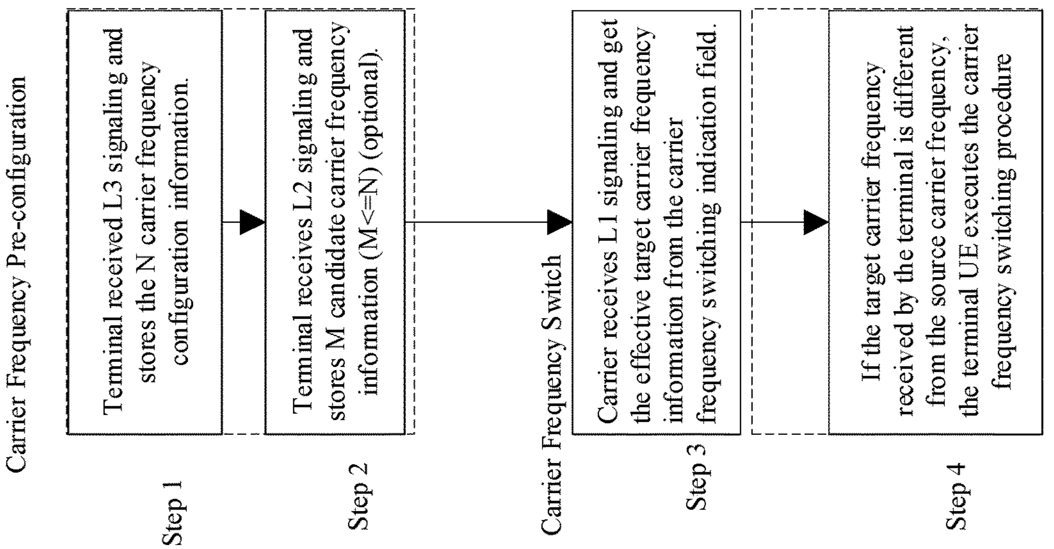
FIG. 5 shows a flowchart for an example of a carrier frequency switching method.

FIG. 5 shows a carrier frequency switching method in this application, which is divided into two parts: carrier frequency pre-configuration and carrier frequency switching. Steps 1 and 2 show the method of carrier frequency pre-configuration. Steps 3 and 4 show the method of carrier frequency switching:

Step 1: Carrier frequency pre-configuration. In this step, the network side configures the terminal UE, through high-level signaling, with N carrier frequencies, which are called a carrier frequency set. The UE receives and stores N physical carrier frequency configuration information configured on the network side.

The carrier frequency configuration information includes at least the following three types of information: 1) Carrier frequency high-level configuration, and 2) configuration information of each carrier under the carrier frequency Here, high-level signaling includes but is not limited to radio resource control RRC signaling, MAC CE and other signaling.

Step 2: Candidate carrier frequency (optional): In this step, the network side sends M candidate carrier frequencies to the UE through a high-level signaling, where M<=N. The M carrier frequencies are called a candidate carrier frequency set. The terminal receives and stores the candidate carrier frequency information.

Further, the high-level signaling includes but is not limited to RRC signaling, MAC CE and other signaling.

Further, M and N can be 1, 2, 3, 4 . . . 32, however, other values can also be considered. In addition, an index or identification can be assigned to the carrier frequency and the candidate carrier frequency to uniquely identify the carrier frequency/candidate carrier frequency.

Further, if a step 2 candidate carrier frequency step is adopted, and the carrier frequency configuration and the candidate carrier frequency configuration use different signaling (for example, the carrier frequency configuration uses layer 3, and the candidate carrier frequency configuration uses layer 2 signaling), L3 signaling can realize and function the carrier frequency and candidate carrier frequency configurations at the same time.

Step 3: The terminal receives the L1 signaling, and obtains the information of an effective target carrier frequency from the carrier frequency switching indication field. Here, "effective" may mean that the carrier frequency belongs to the carrier frequency set or the candidate carrier frequency set.

Step 4: If the target carrier frequency received by the terminal is different from the source carrier frequency, the terminal UE executes the carrier frequency switch procedure, and the corresponding carrier parameters are updated synchronously.

Compared with the existing protocol methods, the carrier frequency switch method of the present application configures the carrier frequency information in advance, which can minimize the handover delay. The carrier frequency switching through L1 signaling (non-L3 signaling) further shorten the handover delay.

Figure 6:
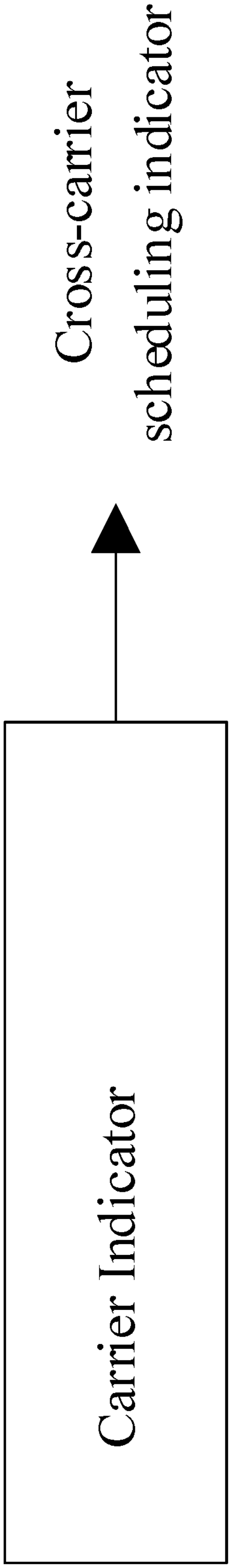
FIG. 6 shows an example of a control message format.
Figure 7:
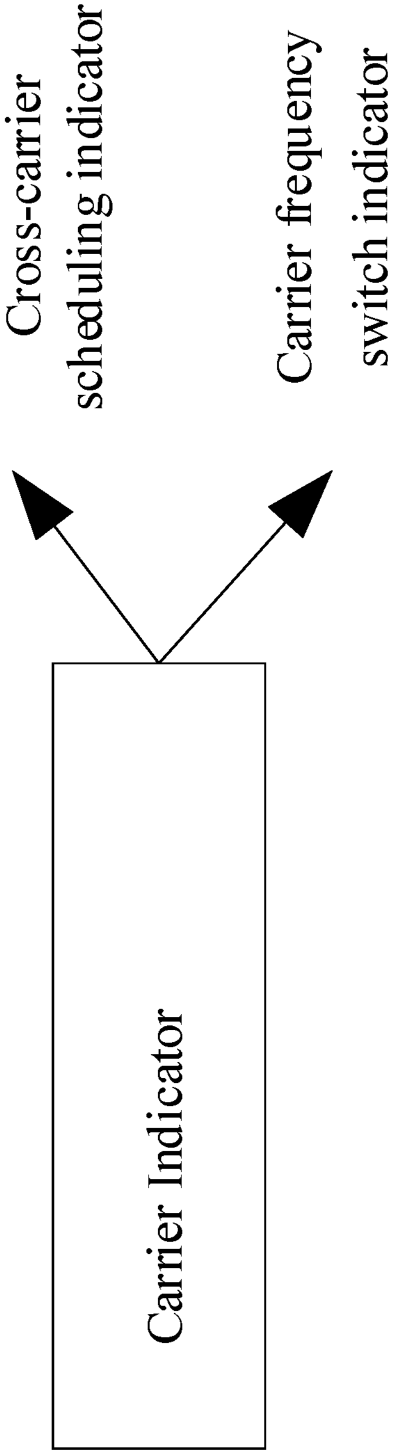
FIG. 7 shows an example of a control message format used for carrier switching.

The L1 signaling indication carrier frequency switching method mentioned in step 3 of FIG. 5 is shown in FIG. 7: control the use of the existing DCI field Carrier indicator through adding the high-level parameter Carrier use indicator. When the Carrier use indicator is in state 1, the Carrier indicator is used for Cross-carrier scheduling; when the Carrier use indicator is in state 2, the carrier indicator is used for carrier frequency switch instructions. Compared with the present protocol in FIG. 6, this method has the same number of bits occupied by DCI, and only adds high-level fields. Compared with the present protocol method, the carrier frequency switch method of the present application configures the carrier frequency information in advance, which can minimize the handover delay; the carrier frequency switching (non-L3 signaling) is performed through L1 signaling, and the handover delay is further shortened.

Further, the Carrier use indicator, which is used to indicate the mapping relationship of the UE Carrier indicator, includes but is not limited to: one field with value true or false. Alternatively, or in addition, the indicator may comprise a field with value dynamic or default. Alternatively, or in addition, a field with value in a range: 0, 1, 2, 3 . . . may be used.

Further, the carrier frequency switch procedure in the embodiment is also used with a new generation of communication technology. But in terms of using L1 signaling, the new generation of communications has a more flexible design. For example, the L1 message may use a new format that is different from a legacy format used for a corresponding L1 message.

Figure 8:
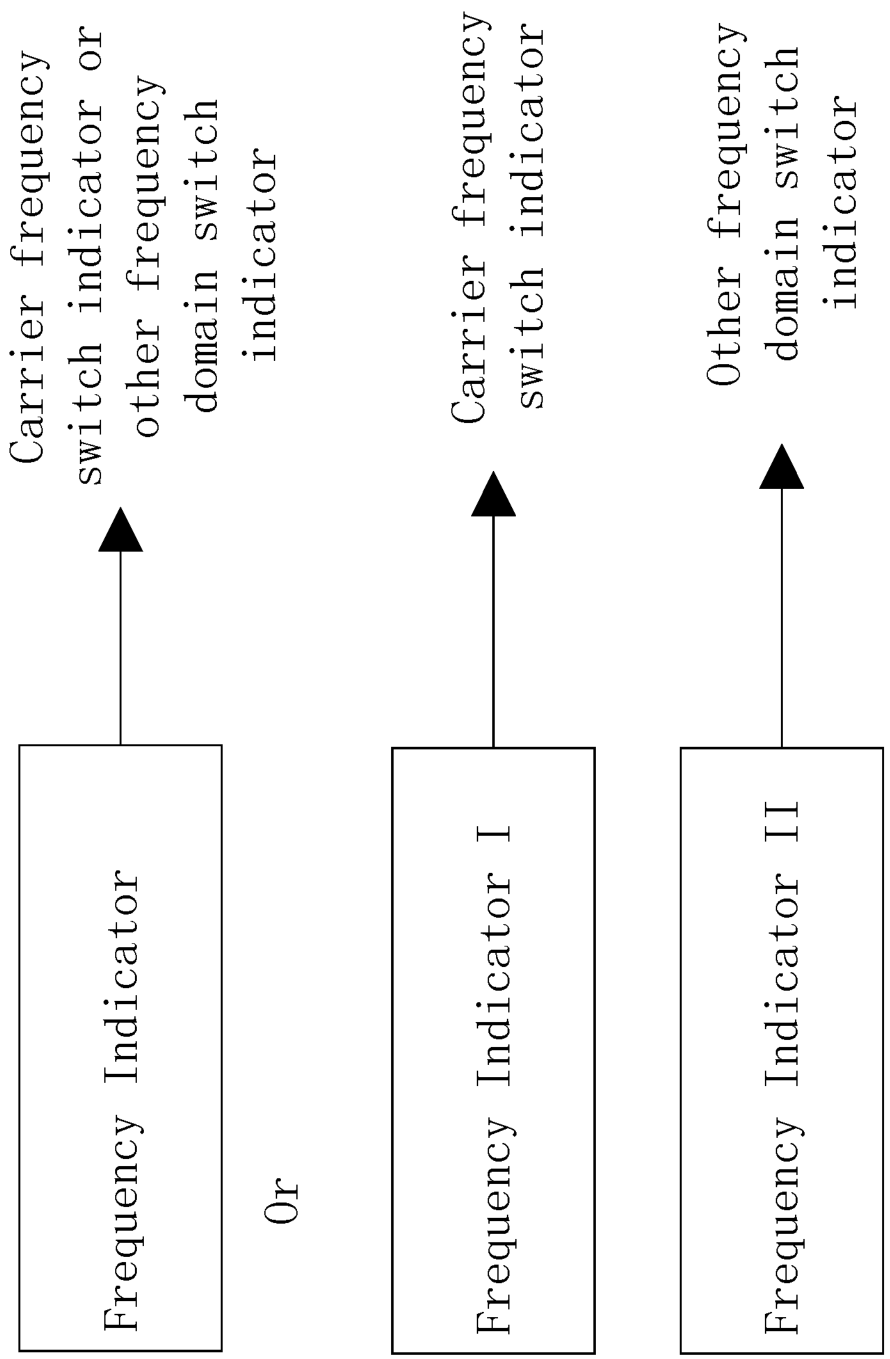
FIG. 8 shows another example of a control message.

FIG. 8 provides two new generation L1 signaling methods for indicating carrier frequency switch. The general field Frequency indicator is introduced in L1 signaling and can be used but not limited to indicate the frequency domain switch at other levels. In some embodiments, multiple field IDs can be introduced to indicate carrier frequency or frequency domain switch at other levels at the same time. The above two methods provide flexibility in the carrier frequency switch mode. For example, this signaling could be used for indicating different levels of frequency switching at the same time or in the same message.

Further, the number of bits of the field ID may be a fixed value or a value configurable by a higher layer signaling. The syntax of this message may be known a priori to a receiving wireless device.

FIG. 6 shows an example of the DCI design of the present protocol comes from Section 7.3.1.1.2 and 7.3.1.2.2 of the protocol 38.212. Here, a carrier indicator field is used for indicating whether cross-carrier scheduling is activated or not.

Figure 9:
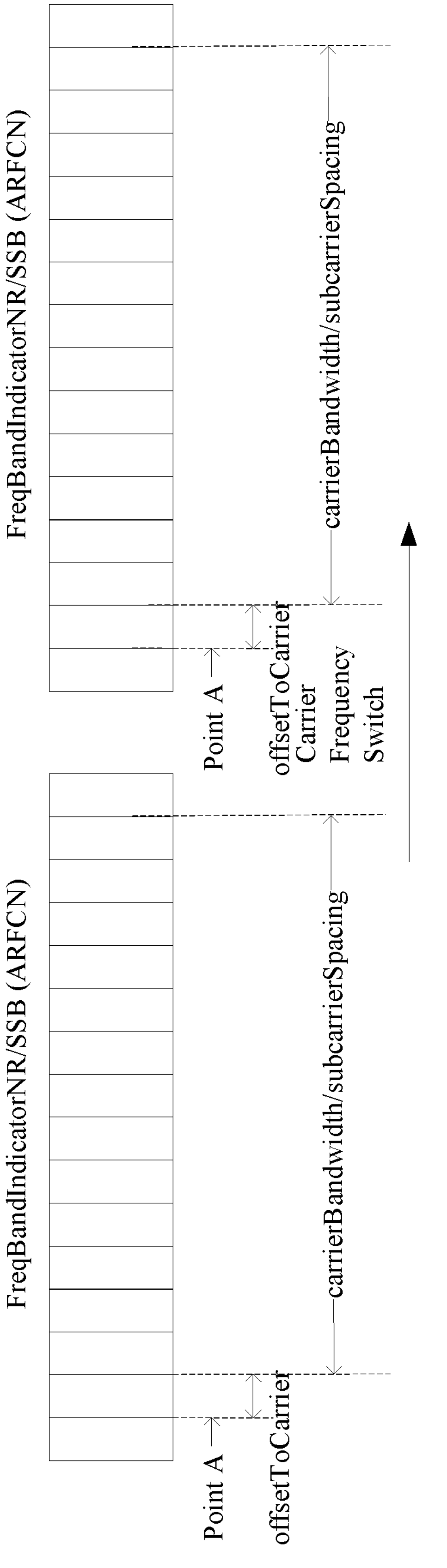
FIG. 9 shows an example of a carrier frequency switch model in which frequency domain parameters may be changed.

The frequency domain parameters update after the carrier frequency switching mentioned in step 4 in FIG. 5 is shown in FIG. 9. Since multiple carrier frequency parameters have been configured for and sent to the terminal in step 1, the terminal can directly activate the new carrier frequency parameters in step four. The new carrier frequency parameters include band number: FreqBandIndicatorNR the common reference point A among different subcarrier spacing resource grid (ARFCN), a resource grid, and the frequency domain offset of Point A: offsetToCarrier, subcarrier spacing subcarrierSpacing, carrier bandwidth carrierBandwidth.

In a legacy format, the above parameters are interpreted similar to the 3GPP TS 38.331 protocol IE FrequencyInfoDL and IE FrequencyInfoUL. The meaning of the parameters in a legacy format can be found in section 4.4.2 of the 38.211 protocol.

Figure 10:
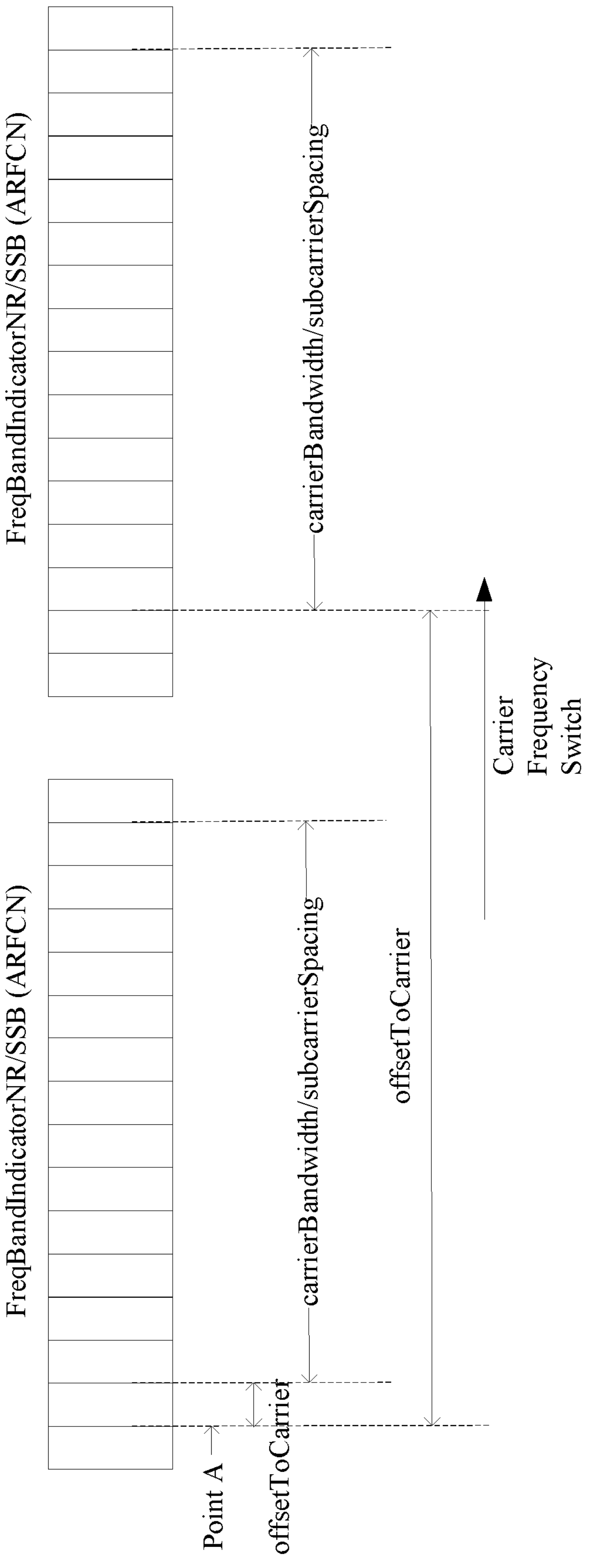
FIG. 10 shows another example of a carrier frequency switch model.

FIG. 10 simplifies Point A (ARFCN), as depicted. In the depicted embodiment, multiple configured carrier frequencies use one Point A. As a result, the Point A parameters do not need to be changed after frequency domain switch. One advantage of this technique is a faster switching with less overhead of transmission.

Figure 11:
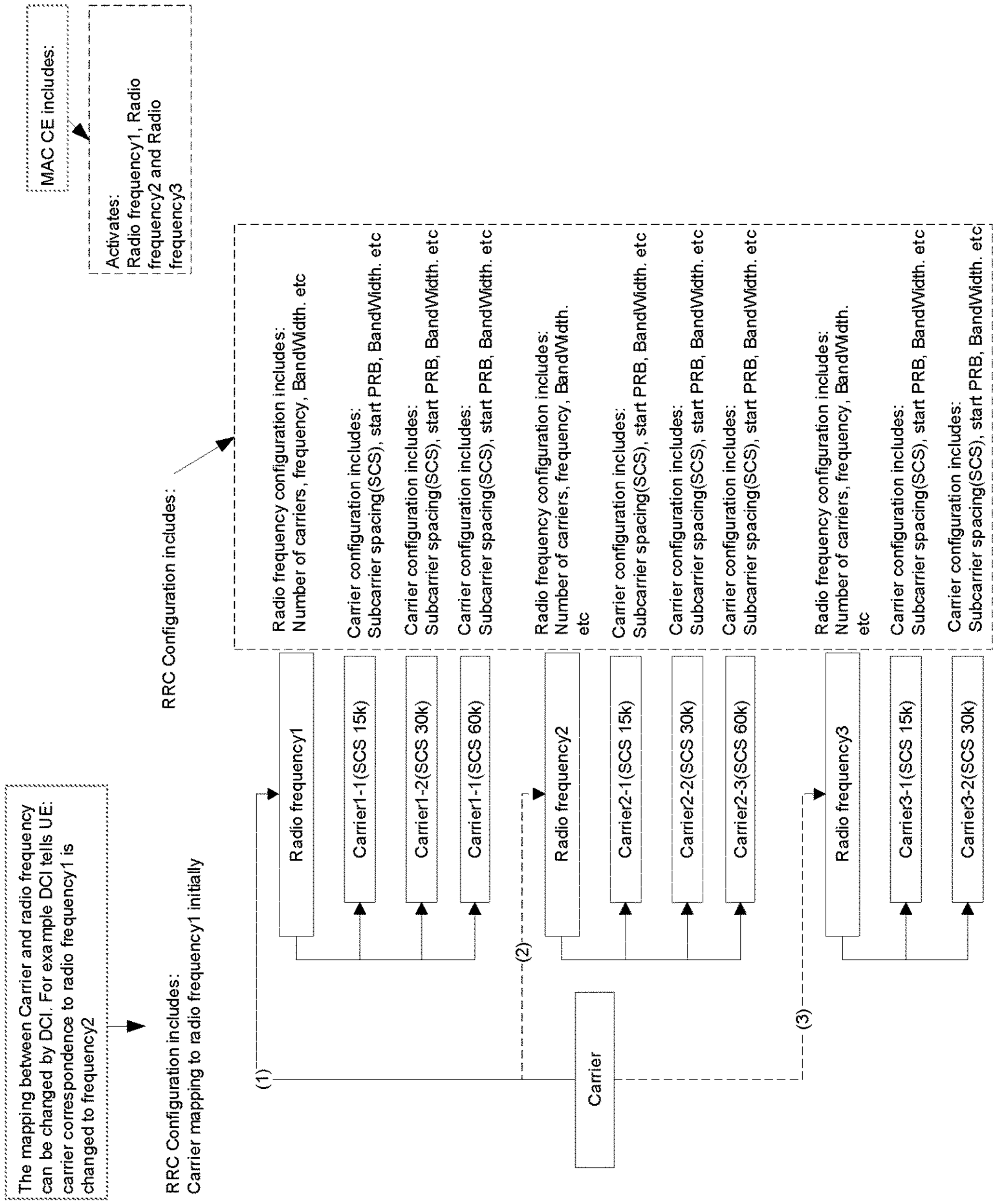
FIG. 11 is an example of a messaging architecture for carrier frequency switch operation.

FIG. 11 is an example of a messaging architecture for carrier frequency switch operation. As depicted in this drawing, on the left, information carried in a high layer message (e.g., radio resource control RRC message) is shown to include mappings of radio frequencies and carriers. The first RRC configuration includes 3 carriers, configuration includes frequency and bandwidth. For each carrier, a corresponding configuration includes subcarrier spacing, a starting physical resource block (PRB) and bandwidth. As further depicted, a medium access control (MAC) control element (CE) may be used to activate one of radio frequency 1, radio frequency 2 or radio frequency 3. In the example depicted in FIG. 11, radio frequency configuration includes: number of carriers, frequency, bandwidth, etc. The carrier configuration includes subcarrier spacing SCS, starting physical resource block PRB, bandwidth, etc. In this example, the correspondence between a carrier and a radio frequency can be changed by a DCI message. For example, a DCI message reception may instruct a wireless device (e.g., UE) that a carrier corresponding to radio frequency 1 is to be changed to frequency 2. In this example, the RRC configuration may include indicating which radio frequency is to correspond to a carrier (e.g., the carrier will correspond to radio frequency 1 initially).

Figure 12A:
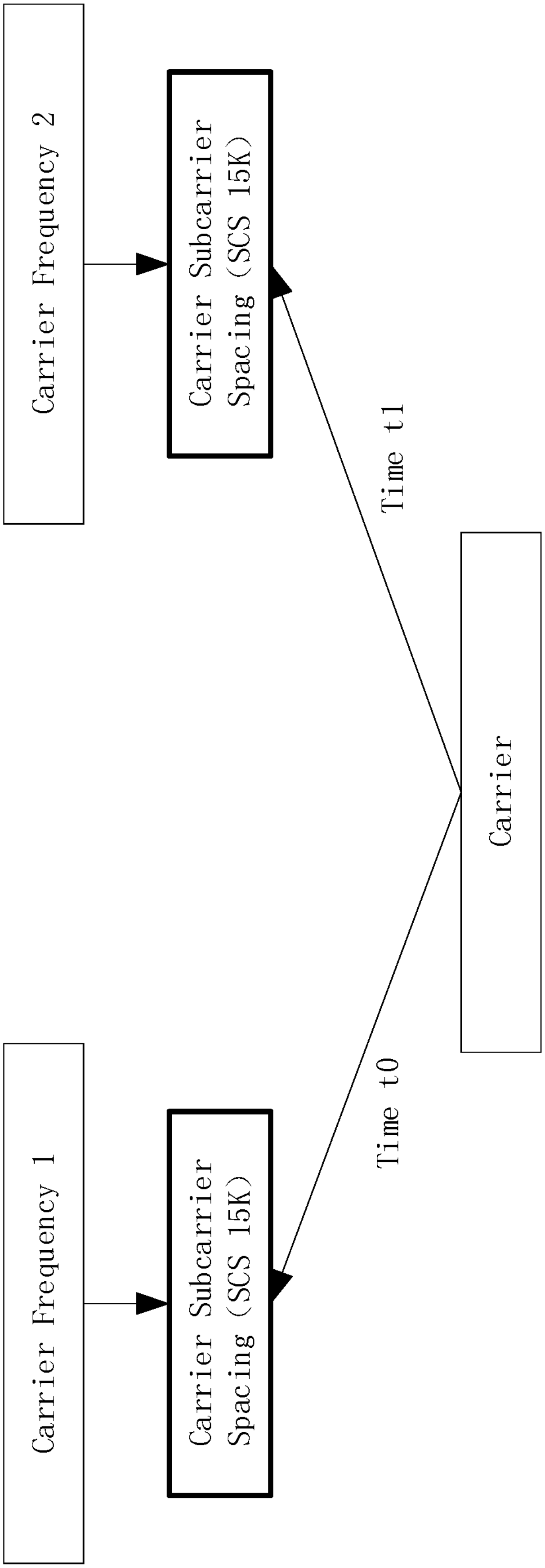
FIG. 12A-12C show an example of a switching operation.
Figure 12B:
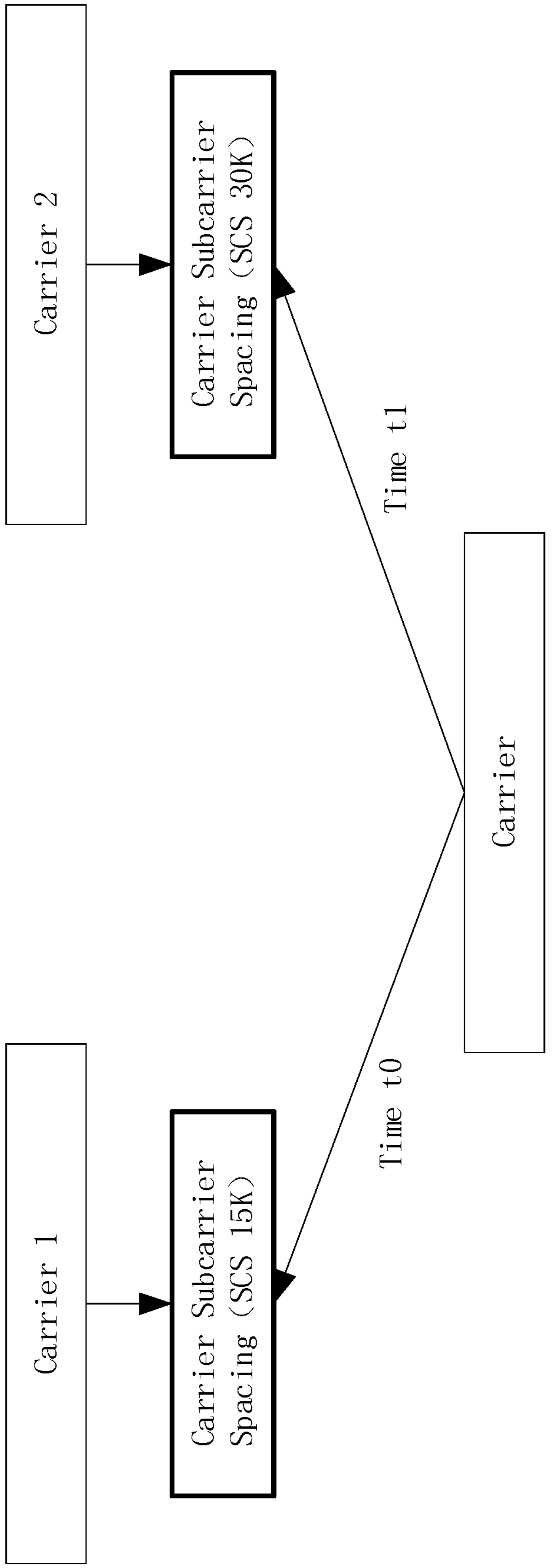
Figure 12C:
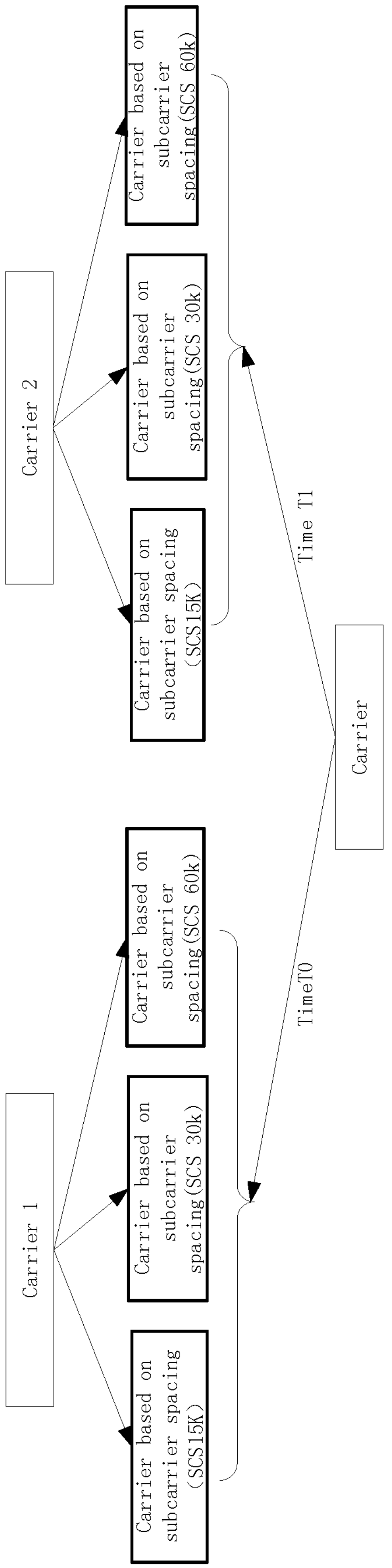

FIG. 12A-12C show an example of a switching operation.

FIG. 12A shows an example where at two different times t0 and t1, a same carrier may be mapped to different configurations that include, e.g., carrier frequency or subcarrier spacing. Here, subcarrier spacing of both mappings is same.

FIG. 12B shows an example similar to FIG. 12A, but a different subcarrier spacing may be configured at time t1 (30 KHz).

FIG. 12C shows an example where the carrier may be to have different carriers having different subcarrier spacings.

Some preferred embodiments may include the following technical solutions.

Figure 15:
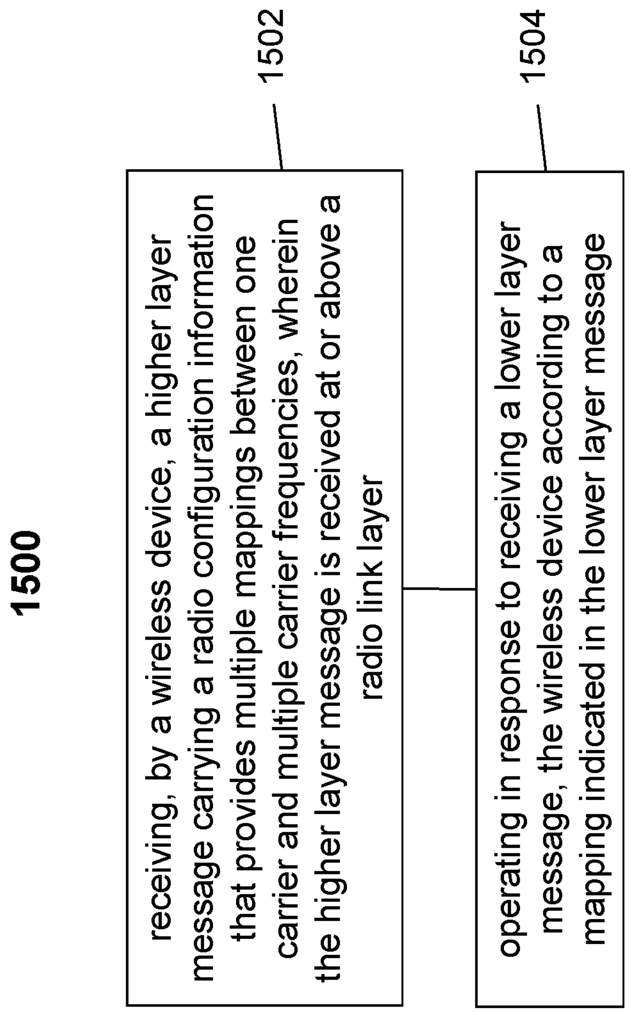
FIGS. 15 to 18 show flowchart examples for method of wireless communication.

1. A method of wireless communication (e.g., method 1500 depicted in FIG. 15), comprising: receiving (1502), by a wireless device, a higher layer message carrying a radio configuration information that provides multiple mappings between one carrier and multiple carrier frequencies, wherein the higher layer message is received at or above a radio link layer; and operating (1504) in response to receiving a lower layer message, the wireless device according to a mapping indicated in the lower layer message.

2. The method of solution 1, wherein the lower layer message is a layer 1 (L1) layer message.

3. The method of solution 1, wherein the lower layer message comprises a downlink control information (DCI) message.

4. The method of solution 1, wherein the higher layer message is a layer 3 (L3) layer message.

5. The method of solution 1, wherein the radio configuration information comprises a carrier frequency set comprising multiple carrier frequencies.

6. The method of solution 5, wherein the radio configuration information comprises a candidate carrier frequency set, which is a subset of the carrier frequency set.

7. The method of solution 6, wherein the radio configuration information provide mapping from the carrier to the frequencies in the carrier frequency set and the mapping from the carrier to the frequencies in the candidate frequency set.

8. The method of any of above solutions, wherein the lower layer message follows a legacy message format and wherein the mapping is indicated by a reserved field in the legacy message format.

9. The method of any of above solutions, wherein the configuring the mapping comprises using a configuration previously received by the wireless device from another higher layer message.

10. The method of any of solutions 1-4, wherein the configuring the mapping comprises using a configuration known a priori to the wireless device.

Figure 16:
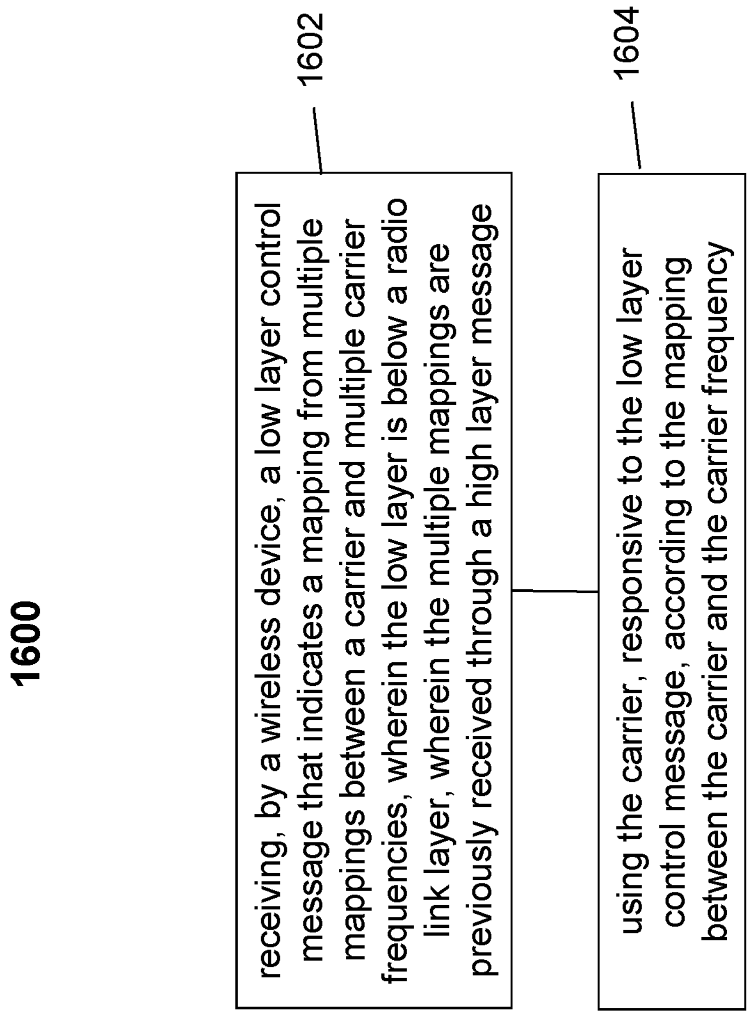

11. A method of wireless communication (e.g., method 1600 depicted in FIG. 16), comprising: receiving (1602), by a wireless device, a low layer control message that indicates a mapping from multiple mappings between a carrier and multiple carrier frequencies, wherein the low layer is below a radio link layer, wherein the multiple mappings are previously received through a high layer message, wherein the high layer is at or above the radio link layer, wherein the carrier is used for communication between the wireless device and a network device; and using (1604) the carrier, responsive to the low layer control message, according to the mapping between the carrier and the carrier frequency.

12. The method of solution 11, wherein the wireless device determines that the low layer control message is indicating the mapping according to a control setting received in the high layer control message.

13. The method of solution 11, wherein the multiple mappings comprise mappings known a priori to the wireless device.

14. The method of solution 11, wherein a first field in the low layer message indicates the mapping.

15. The method of any of solutions 11-14, wherein the low layer control message conforms to a legacy format.

16. The method of solution 11, wherein the multiple carrier frequencies share a frequency offset point, and the mapping does not change parameters of the frequency offset point.

17. The method of any of solutions 11-16, wherein the low layer control message is a downlink control information (DCI) message.

18. The method of any of solutions 11-13, wherein the multiple mappings are between carriers of operation of the wireless device and carrier frequencies of operation of the wireless device.

Figure 17:
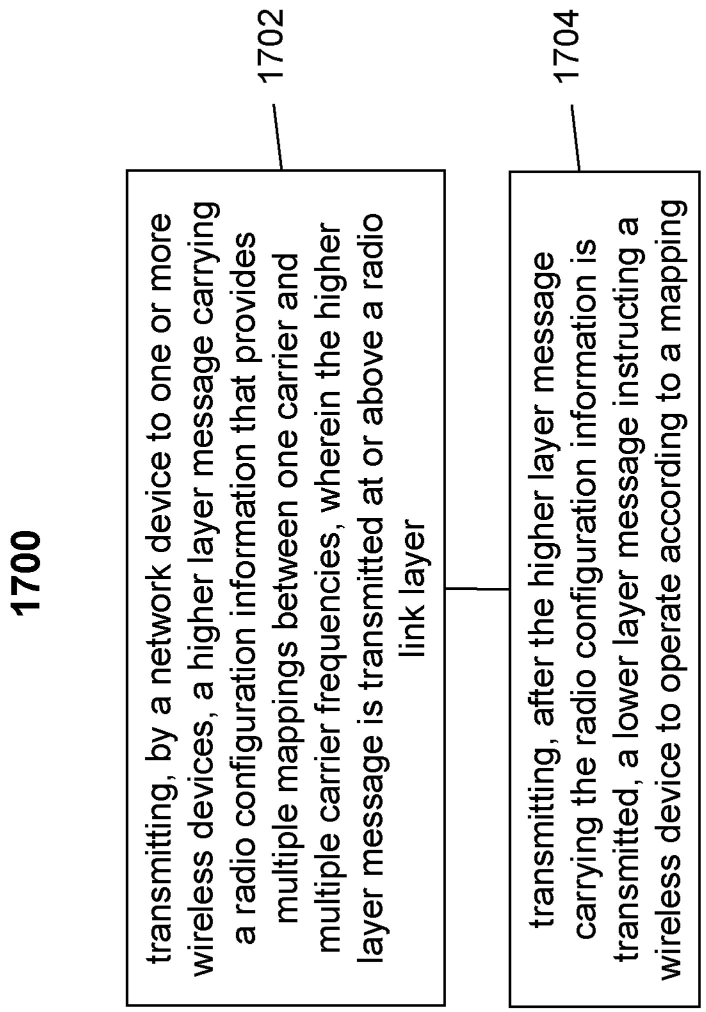

19. A method of wireless communication (e.g., method 1700 depicted in FIG. 17), comprising: transmitting (1702), by a network device to one or more wireless devices, a higher layer message carrying a radio configuration information that provides multiple mappings between one carrier and multiple carrier frequencies, wherein the higher layer message is received at or above a radio link layer; and transmitting (1704), after the higher layer message carrying the radio configuration information is transmitted, a lower layer message instructing a wireless device to operate according to a mapping.

20. The method of solution 19, wherein the lower layer message is a layer 1 (L1) layer message.

21. The method of solution 19, wherein the lower layer message comprises a downlink control information (DCI) message.

22. The method of solution 19, wherein the higher layer message is a layer 3 (L3) layer message.

23. The method of solution 19, wherein the radio configuration information comprises a carrier frequency set comprising multiple carrier frequencies.

24. The method of solution 23, wherein the radio configuration information comprises a candidate carrier frequency set, which is a subset of the carrier frequency set.

25. The method of solution 24, wherein the radio configuration information provide mapping from the carrier to the frequencies in the carrier frequency set and the mapping from the carrier to the frequencies in the candidate frequency set.

26. The method of any of solutions 19-25, wherein the lower layer message follows a legacy message format and wherein the mapping is indicated by a reserved field in the legacy message format.

27. The method of any of solutions 19-26, wherein the configuring the mapping comprises using a configuration previously transmitted to the wireless device by another higher layer message.

28. The method of any of solutions 19-22, wherein the configuring the mapping comprises using a configuration known a priori to the wireless device.

Figure 18:
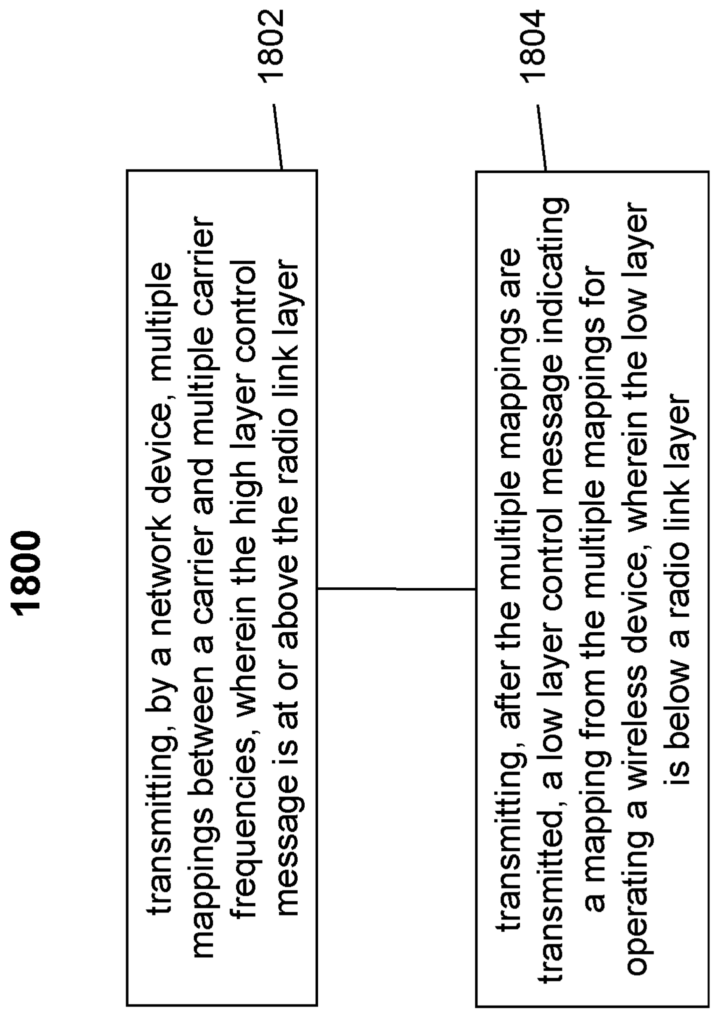

29. A method of wireless communication (e.g., method 1800 depicted in FIG. 18), comprising: transmitting (1802), by a network device, multiple mappings between a carrier and multiple carrier frequencies, wherein the high layer control message is at or above the radio link layer; and transmitting (1804), after the multiple mappings are transmitted, a low layer control message indicating a mapping from the multiple mappings for operating a wireless device, wherein the low layer is below a radio link layer.

30. The method of solution 29, wherein the low layer control message indicates the mapping according to a control setting transmitted through the high layer control message.

31. The method of solution 29, wherein the multiple mappings comprise mappings known a priori to the wireless device.

32. The method of solution 29, wherein a field in the low layer message indicates the mapping.

33. The method of solution 29, wherein the low layer control message conforms to a legacy format.

34. The method of solution 29, wherein the multiple carrier frequencies share a frequency offset point, and the mapping does not change the parameters of the frequency offset point.

35. The method of any of solutions 29-31, wherein the low layer control message is a downlink control information (DCI) message.

36. The method of any of solutions 29-32, wherein the multiple mappings comprise a mapping between a carrier of operation of the wireless device and a carrier frequency of operation of the wireless device.

37. An apparatus for wireless communication comprising a processor configured to implement the method of any of solutions 1 to 36.

38. A computer readable medium having code stored thereon, the code when executed by a processor, causing the processor to implement a method recited in any of solutions 1 to 36.

In these solutions, the legacy format may refer to a message format that is understood by presently implemented wireless devices. For example, in some embodiments, a same syntax element in a message may be understood and interpreted differently by a wireless device depending on whether the device is configured to implement a legacy protocol (e.g., 5G NR or LTE protocol) or whether the wireless device is configured to implement a method disclosed in the present application. As another example, in some embodiments, a syntax field or structure in an L1 message may be ignored or parsed over by a wireless device configured to operate according to a legacy protocol as belonging to a reserved field. By contrast, a wireless device configured to implement the methods described in the present application may interpret the syntax element. In some embodiments, how to interpret the syntax element in L1 will depend on a condition or context by which the interpretation may take on different meanings. This condition may be indicated by a high layer message (e.g., L3 message) in some embodiments.

It will be appreciated that techniques that can be used by embodiments to achieve baseband and radio frequency decoupling have been disclosed. One disclosed method of intercarrier mapping between different carrier types includes selecting the appropriate carrier frequency within the carrier frequency set, mapping the carrier to carrier frequency in a flexible way.

It will further be appreciated that the disclosed in the disclosed method, the carrier frequency selection can be made in the carrier frequency set or the candidate carrier frequency set.

It will further be appreciated that the present document discloses a method of using L1 signaling to indicate the carrier frequency, which multiplex the existing L1 signaling field to indicate a new generation of carrier switching.

Some disclosed embodiments may control the use of the DCI field Carrier indicator by adding a new high-level parameter Carrier use indicator.

Some disclosed embodiments may use L1 signaling to indicate the carrier frequency, which uses a common field to indicate a new generation of carrier frequency switch.

It will further be appreciated that the present document introduces a general field Frequency indicator in DCI, which includes but not limited to carrier frequency switching, but also may indicate frequency domain switching at other levels.

It will further be appreciated that the present document introduces multiple field IDs in DCI, which can indicate carrier frequency or frequency domain switching at different levels at the same time.

One advantage of the disclosed embodiments may be that the configured multiple carrier frequencies share one Point A, and the Point A parameters do not need to be changed for carrier frequency switch.

Figure 13:
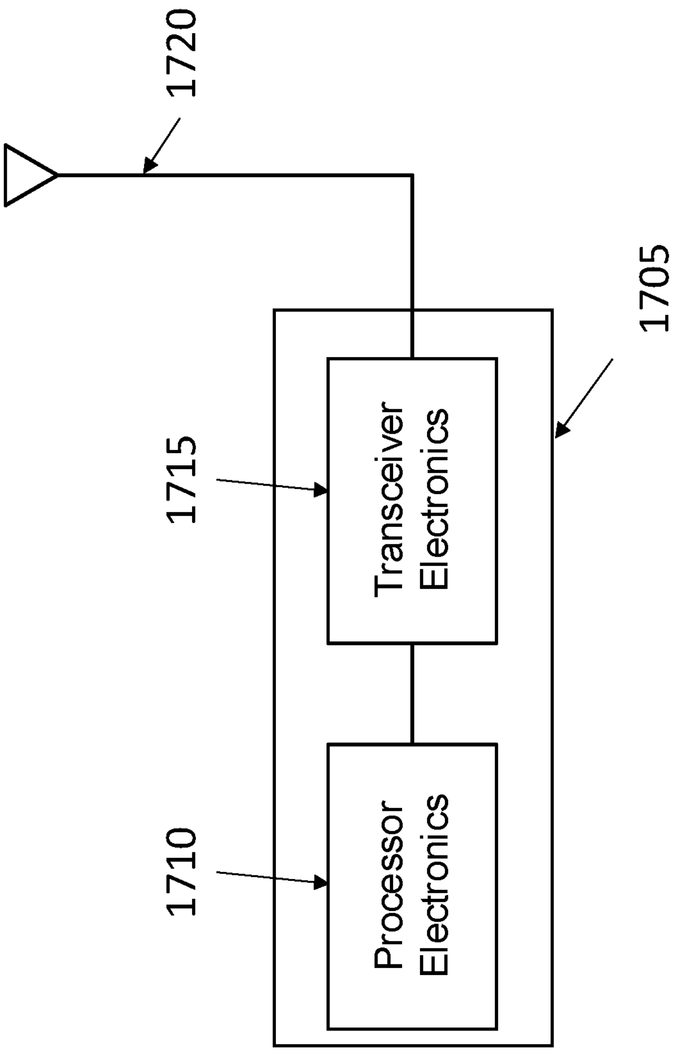
FIG. 13 is a block diagram representation of a portion of an apparatus that can be used to implement methods and/or techniques described in the present document.

FIG. 13 is a block diagram representation of a portion of an apparatus, in accordance with some embodiments of the presently disclosed technology. An apparatus 1705 such as a network device or a base station or a wireless device (or UE), can include processor electronics 1710 such as a microprocessor that implements one or more of the techniques presented in this document. The apparatus 1705 can include transceiver electronics 1715 to send and/or receive wireless signals over one or more communication interfaces such as antenna(s) 1720. The apparatus 1705 can include other communication interfaces for transmitting and receiving data. Apparatus 1705 can include one or more memories (not explicitly shown) configured to store information such as data and/or instructions. In some implementations, the processor electronics 1710 can include at least a portion of the transceiver electronics 1715. In some embodiments, at least some of the disclosed techniques, modules or functions are implemented using the apparatus 1705.

Figure 14:
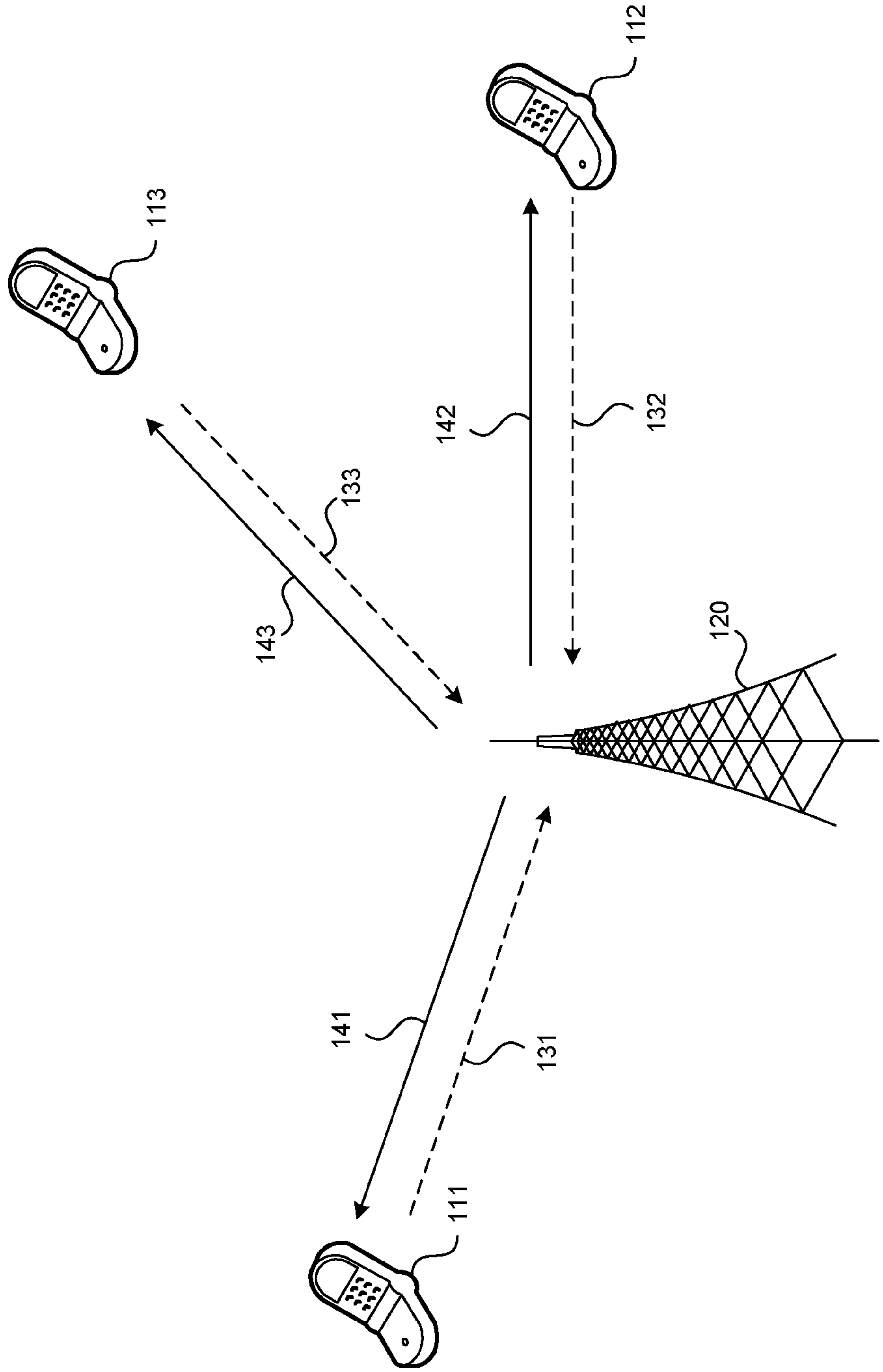
FIG. 14 shows an example wireless network in which the methods described in the present document may be implemented.

FIG. 14 shows an example of a wireless network in which various technical solutions disclosed in the present document may be disclosed. The wireless network may include a network device 120, which may be a base station such as a cell tower or a satellite base station or an aerial vehicle based base station, and so on. The network device 120 may provide radio connectivity to a number of wireless devices 111, 112, 113, using communication paths 131, 132, 133 (sometimes called uplink) 141, 142, 143 (sometimes called downlink) having transmission directions to the network (131, 132, 133) or from the network to the wireless devices (141, 142, 143). Although not depicted in FIG. 14, the network device 120 may be in communication with other devices in the wireless network using a wired or wireless connection and may provide connectivity to core network and application servers.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements and variations can be made based on what is described and illustrated in this disclosure.

What is claimed is:

1. A method of wireless communication, comprising:

receiving, by a wireless device, a higher layer control message carrying a radio configuration information that provides multiple mappings between one or more subcarriers based on at least one subcarrier interval and multiple physical carrier frequencies, wherein a first mapping of the multiple mappings comprises a correspondence between a first subcarrier of the one or more subcarriers and a physical carrier frequency of the multiple physical carrier frequencies, and wherein the higher layer control message is received at or above a radio link layer; and performing, with a network device, in response to receiving a lower layer control message subsequent to receiving the higher layer control message, a transmission or a reception according to a second mapping of the multiple mappings indicated in the lower layer control message, wherein the lower layer control message is received below the radio link layer.

2. The method of claim 1, wherein the lower layer control message comprises a layer 1 (L1) layer message or a downlink control information (DCI) message, and wherein the higher layer control message comprises a layer 3 (L3) layer message.

3. The method of claim 1, wherein the radio configuration information comprises (a) a carrier frequency set comprising the multiple physical carrier frequencies and (b) a candidate carrier frequency set, which is a subset of the carrier frequency set.

4. The method of claim 3, wherein the radio configuration information provides a third mapping from the one or more subcarriers to physical carrier frequencies in the carrier frequency set and a fourth mapping from the one or more subcarriers to physical carrier frequencies in the candidate carrier frequency set.

5. The method of claim 1, wherein the lower layer control message follows a legacy message format, and wherein the second mapping is indicated by a reserved field in the legacy message format.

6. The method of claim 1, wherein the second mapping is configured based on (a) a configuration previously received by the wireless device from another higher layer control message, or (b) a configuration known a priori to the wireless device.

7. A method of wireless communication, comprising:

receiving, by a wireless device, a lower layer control message that indicates a second mapping of multiple mappings between one or more subcarriers based on at least one subcarrier interval and multiple physical carrier frequencies, wherein a first mapping of the multiple mappings comprises a correspondence between a first subcarrier of the one or more subcarriers and a physical carrier frequency of the multiple physical carrier frequencies, wherein the lower layer control message is received below a radio link layer, wherein the multiple mappings were previously received through a higher layer control message, wherein the higher layer control message was received at or above the radio link layer, wherein the one or more subcarriers is used for communication between the wireless device and a network device; and using the one or more subcarriers, responsive to the lower layer control message, to perform a transmission or reception according to the second mapping between the one or more subcarriers and the multiple physical carrier frequencies.

8. The method of claim 7, wherein the wireless device is configured to determine that the lower layer control message is indicating the second mapping according to a control setting received in the higher layer control message.

9. The method of claim 7, wherein the multiple mappings comprise mappings known a priori to the wireless device.

10. The method of claim 7, wherein:

a first field in the lower layer control message indicates the second mapping, or the lower layer control message conforms to a legacy format, or the lower layer control message is a downlink control information (DCI) message.

11. The method of claim 7, wherein the multiple physical carrier frequencies share a frequency offset point, and wherein the second mapping does not change parameters of the frequency offset point.

12. The method of claim 7, wherein the multiple mappings are between carriers of operation of the wireless device and carrier frequencies of operation of the wireless device.

13. A method of wireless communication, comprising:

transmitting, by a network device to one or more wireless devices, a higher layer control message carrying a radio configuration information that provides multiple mappings between one or more subcarriers and multiple physical carrier frequencies, wherein a first mapping of the multiple mappings comprises a correspondence between a first subcarrier of the one or more subcarriers and a physical carrier frequency of the multiple physical carrier frequencies, wherein the higher layer control message is transmitted at or above a radio link layer; and transmitting, after the higher layer control message carrying the radio configuration information was transmitted, a lower layer control message instructing a wireless device to perform a transmission or reception according to a second mapping of the multiple mappings.

14. The method of claim 13, wherein the lower layer control message comprises a layer 1 (L1) layer message or a downlink control information (DCI) message, wherein the higher layer control message comprises a layer 3 (L3) layer message.

15. The method of claim 13, wherein the radio configuration information comprises (a) a carrier frequency set comprising the multiple physical carrier frequencies and (b) a candidate carrier frequency set, which is a subset of the carrier frequency set.

16. The method of claim 15, wherein the radio configuration information provides a third mapping from the one or more subcarriers to physical carrier frequencies in the carrier frequency set and a fourth mapping from the one or more subcarriers to physical carrier frequencies in the candidate carrier frequency set.

17. A method of wireless communication, comprising:

transmitting, by a network device to a wireless device, a higher layer control message comprising multiple mappings between one or more subcarriers and multiple physical carrier frequencies, wherein a lower layer control message indicating a second mapping of the multiple mappings to enable the wireless device to perform a transmission or a reception according to the second mapping, wherein the higher layer control message is transmitted at or above a radio link layer, wherein the lower layer control message is transmitted below the radio link layer, wherein a first mapping of the multiple mappings comprises a correspondence between a first subcarrier of the one or more subcarriers and a first physical carrier frequency of the multiple physical carrier frequencies.

18. The method of claim 17, wherein the lower layer control message indicates the second mapping according to a control setting transmitted through the higher layer control message.

19. An apparatus for wireless communication, comprising:

one or more processors configured to:

receive, by a wireless device, a higher layer control message carrying a radio configuration information that provides multiple mappings between one or more subcarriers based on at least one subcarrier interval and multiple physical carrier frequencies, wherein a first mapping of the multiple mappings comprises a correspondence between a first subcarrier of the one or more subcarriers and a physical carrier frequency of the multiple physical carrier frequencies, wherein the higher layer control message is received at or above a radio link layer; and perform, with a network device, in response to receiving a lower layer control message subsequent to receiving the higher layer control message, a transmission or reception according to a second mapping of the multiple mappings indicated in the lower layer control message, wherein the lower layer control message is received below the radio link layer.

20. An apparatus for wireless communication, comprising:

one or more processors configured to:

receive, by a wireless device, a lower layer control message that indicates a second mapping of multiple mappings between one or more subcarriers based on at least one subcarrier interval and multiple physical carrier frequencies, wherein a first mapping of the multiple mappings comprises a correspondence between a first subcarrier of the one or more subcarriers and a physical carrier frequency of the multiple physical carrier frequencies, wherein the lower layer control message is received below a radio link layer, wherein the multiple mappings were previously received through a higher layer control message, wherein the higher layer control message is received at or above the radio link layer, wherein the one or more subcarriers is used for communication between the wireless device and a network device; and use the one or more subcarriers, responsive to the lower layer control message, to perform a transmission or a reception according to the second mapping between the one or more subcarriers and the multiple physical carrier frequencies.

* * * * *